United States Patent
Highman et al.

(10) Patent No.: US 10,747,407 B2
(45) Date of Patent: Aug. 18, 2020

(54) SYSTEM AND METHOD FOR DELIVERING MODULAR TOOLS

(71) Applicant: Genesys Telecommunications Laboratories, Inc., Daly City, CA (US)

(72) Inventors: Christopher Carl Highman, Carmel, IN (US); Kyle Duke, Indianapolis, IN (US); Guysung Kim, Carmel, IN (US); Armando Luja, Fort Wayne, IN (US); Michael J. Weldy, Brownsburg, IN (US); Kevin Wiegand, Bushnell, FL (US)

( * ) Notice: Subject to any disclaimer, the term of this patent is extended or adjusted under 35 U.S.C. 154(b) by 0 days.

(21) Appl. No.: 16/229,027

(22) Filed: Dec. 21, 2018

(65) Prior Publication Data
US 2020/0201497 A1  Jun. 25, 2020

(51) Int. Cl.
*H04L 12/24*  (2006.01)
*G06F 8/77*  (2018.01)
(Continued)

(52) U.S. Cl.
CPC ............ *G06F 3/0484* (2013.01); *G06F 9/451* (2018.02); *G06F 9/54* (2013.01); *G06F 40/14* (2020.01); *G06F 21/629* (2013.01); *G06Q 30/016* (2013.01); *H04L 41/12* (2013.01); *H04L 67/02* (2013.01); *H04L 67/1097* (2013.01)

(58) Field of Classification Search
CPC . H04L 41/5041; H04L 41/5045; H04L 41/12; H04L 67/1097; H04L 67/02; G06F 8/38; G06F 21/629; G06F 3/0484; G06F 9/451; G06F 9/54; G06F 40/14; G06Q 30/016
See application file for complete search history.

(56) References Cited

U.S. PATENT DOCUMENTS

| | | | |
|---|---|---|---|
| 9,336,209 B1 * | 5/2016 | Gupta | ............... G06F 16/93 |
| 9,397,993 B1 * | 7/2016 | Gupta | ............... H04L 67/1097 |

(Continued)

OTHER PUBLICATIONS

Charles Roberts et al., The Web Browser As Synthesizer And Interface, May 27-30, 2013, [Retrieved on Apr. 8, 2020]. Retrieved from the internet: <URL: http://citeseerx.ist.psu.edu/viewdoc/download?doi=10.1.1.431.4831&rep=rep1&type=pdf> 6 Pages (1-6) (Year: 2013).*

(Continued)

*Primary Examiner* — Anibal Rivera

(57) ABSTRACT

A system and method are presented for delivering modular tools through a cloud-based remote computing environment. Users may create and customize extensions to the modular tools for integration with the product system without requiring change to product. Using a script tag added to a website, a user is able to install the modular tool to a website. The modular tool extensions are able to directly communicate with handlers and websites and are able to become directly integrated with a premises-based product. This may be done through a multiplexed API exposed to the modular tool extensions that directly couples them to the premises-based product. The modular tools are able to be configured in the premises-based product, however they are hosted in the cloud and as such, the premises-based product is able to receive continuous integration and deployment from the cloud.

23 Claims, 5 Drawing Sheets

(51) Int. Cl.
*G06F 21/10* (2013.01)
*G06F 3/0484* (2013.01)
*G06F 9/451* (2018.01)
*G06F 9/54* (2006.01)
*G06F 40/14* (2020.01)
*G06Q 30/00* (2012.01)
*G06F 21/62* (2013.01)
*H04L 29/08* (2006.01)

(56) References Cited

U.S. PATENT DOCUMENTS

| | | | | |
|---|---|---|---|---|
| 9,621,418 B2* | 4/2017 | Gibson | | H04L 41/0806 |
| 9,621,428 B1* | 4/2017 | Lev | | H04L 41/0806 |
| 10,417,393 B2* | 9/2019 | Baldwin | | H04L 67/18 |
| 2011/0061002 A1* | 3/2011 | Bethune | | G06F 8/38 |
| | | | | 715/744 |
| 2011/0231280 A1* | 9/2011 | Farah | | G06Q 10/10 |
| | | | | 705/26.8 |
| 2013/0096980 A1* | 4/2013 | Basavapatna | | G06Q 10/00 |
| | | | | 705/7.28 |
| 2014/0281918 A1* | 9/2014 | Wei | | H04L 67/02 |
| | | | | 715/234 |
| 2015/0095482 A1* | 4/2015 | Che | | H04L 41/5041 |
| | | | | 709/223 |
| 2017/0006135 A1* | 1/2017 | Siebel | | G06F 9/5072 |
| 2019/0042630 A1* | 2/2019 | Bolognese | | G06F 16/26 |
| 2019/0042631 A1* | 2/2019 | Bolognese | | G06F 16/2455 |
| 2019/0052549 A1* | 2/2019 | Duggal | | H04L 41/5019 |
| 2019/0265971 A1* | 8/2019 | Behzadi | | H04L 67/12 |

OTHER PUBLICATIONS

Marlon E. Pierce et al., Cyberinfraructure and Web 2.0, 2006, [Retrieved on Apr. 8, 2020]. Retrieved from the internet: <URL: https://s3.amazonaws.com/academia.edu.documents/30895923/10.1.1.72.2000.pdf?> 18 Pages (1-18) (Year: 2006).*

* cited by examiner

SYSTEM AND METHOD FOR DELIVERING MODULAR TOOLS

BACKGROUND

The present invention generally relates to telecommunications systems and methods, as well as modular web components. More particularly, the present invention pertains to delivering modular web components in a contact center or business enterprise center through a cloud-based remote computing environment.

SUMMARY

A system and method are presented for delivering modular tools through a cloud-based remote computing environment. Users may create and customize extensions to the modular tools for integration with the product system without requiring change to product. Using a script tag added to a website, a user is able to install the modular tool to a website. The modular tool extensions are able to directly communicate with handlers and websites and are able to become directly integrated with a premises-based product. This may be done through a multiplexed API exposed to the modular tool extensions that directly couples them to the premises-based product. The modular tools are able to be configured in the premises-based product, however they are hosted in the cloud and as such, the premises-based product is able to receive continuous integration and deployment from the cloud.

In one embodiment, a method is presented for delivering widgets through a cloud-based remote computing environment to a premises-based customer experience platform product, the method comprising: creating and saving a widget by a user through a user interface provided on a device connected to the premises-based customer experience platform product; generating a unique ID and storing a configuration of the widget as a flattened JSON object within a subsystem of the premises-based customer experience platform product; generating a JavaScript snippet associated with the widget as an HTML (Hypertext Markup Language) script tag; applying the snippet associated with the widget to a page in a website; loading implementation of the widget, where an unauthenticated registration request is sent to a server specified in the snippet; and converting a configuration object to a JSON configuration object expected to provide context to the widget and populating the widget with the context.

The script tag may comprise a unique ID and server attributes for the widget. The script tag may also comprise a common static script.

Where the widget comprises an extension, the converting of a configuration object to a JSON configuration object expected to provide context to the widget and populating the widget with the context comprises utilizing a multiplexing API with a REST endpoint where any input fields for population are used as JSON input for a handler. Invoking the JSON input triggers a REST request to be sent to the server. The handler serves as the integration point.

In another embodiment, a method is presented for delivering widgets through a cloud-based remote computing environment to a premises-based customer experience platform product, the method comprising: creating and saving a plurality of widget instances by a user through a user interface provided on a device connected to the premises-based customer experience platform product; selecting a first instance of the plurality of widget instances by the user; generating a unique ID and storing a configuration of the first instance as a flattened JSON object within a subsystem of the premises-based customer experience platform product; generating a script tag for the first instance through the user interface; installing the generated script tag on a page of a website of the user; loading implementation of the first widget instance, where an unauthenticated registration request is sent to a server specified in the script tag; converting, by widgets architecture within the premises-based customer experience platform product, a configuration object to a JSON configuration object expected to provide context to the user's widgets instance; and populating the first instance with context.

Where each of the plurality of widget instances has associated extensions, the extensions may be custom or built-in. Custom extensions may be hosted by the user and referenced by a configuration instance. The extensions and associated configurations may be cloud-based and dynamically appear for the premises-based customer experience platform product.

The user interface comprises fields acting as feature toggles for features and functionality. The fields are available based on user permissions.

A script tag comprises a common static script. The script tag may be encoded and de-coded upon loading. The script tag comprises a unique ID and server attributes for the widget.

Any updates or changes are performed dynamically and continuously through the cloud to the premises-based customer experience platform product.

DETAILED DESCRIPTION

Figure 1:
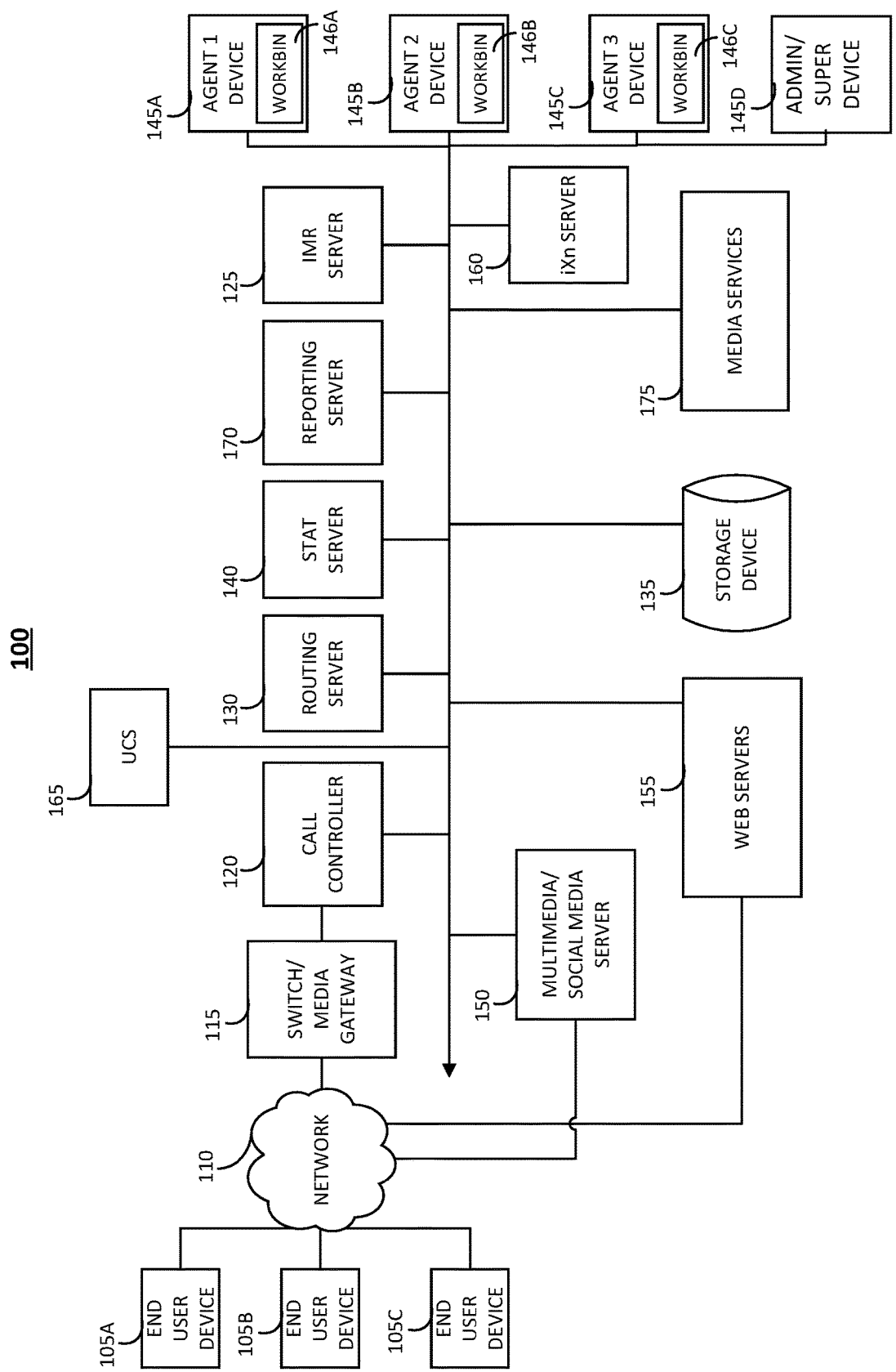
FIG. 1 is a diagram illustrating an embodiment of a communication infrastructure.

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

A widget, in the computing sense, comprises an application, or a component of an interface, that enables a user to perform a function or access a service. Traditionally, widgets may be configured on a website. A user is required to upload a JavaScript file comprising their own permissions within and is a very manual process. Should a contact center or business enterprise utilizing widgets within their contact center or enterprise platform need to make changes, a developer or an IT admin is required. This is impractical if a quick change is necessary, such as a high-volume period, to name a non-limiting example. In an embodiment, a contact center or enterprise platform administrator is able to designate people (such as a supervisor) on the contact center floor to make changes to the widgets instantly. For example, the supervisor might change workgroups handling assignments without needing to involve an IT admin and thus ease a workgroup's backlog. Generally, administrative rights can be delegated.

In an embodiment, widgets (or, alternatively, modular tools) may be hosted in a cloud-based platform (e.g., Genesys Telecommunications Laboratories, Inc.'s PureCloud® platform, Amazon Web Services, Microsoft® Azure, a private cloud, etc.) and communicate seamlessly with a premises-based platform. This premises-based platform may be running in a contact center or an enterprise environment. In an embodiment, the premises-based platform comprises an all-in-one multi-channel communications solution, such as Genesys Telecommunications Laboratories, Inc.'s PureConnect platform, to name a non-limiting example. In an embodiment, the communication between cloud and premises occurs through a multiplexing method that is applied to the context of web-based modular tools for the purposes of enabling a plurality of actions. These modular tools have the extensibility to trigger automation at the server level of the premises-based platform without requiring any product changes. Interaction Designer, or any client-side application that allows a user to model new interactions processes and customize existing interaction processes, may be used. These models are represented within the designer's ad handlers, software programs that describe what the processor should do when a particular event occurs in the network. Interaction Designer is a graphical application generator. Using a program such as Interaction Designer, programs (or handlers) may be written that control various interaction processing behaviors within the premises-based platform. The methods of an embodiment of the system for widgets described herein seek to communicate in a specified way such that a user can utilize a web interface allowing both the widgets and server to seamlessly talk with each other. As a result, the users (those running the contact center or business enterprise platform) do not have to worry about updating the widgets files.

In an embodiment, widgets comprise modular web components that are able to be deployed directly onto websites. These modular web components allow for services such as live chat, callbacks, contextual help, etc., to name a few non-limiting examples. Widgets may also comprise extensions for an Application Programming Interface (API) that allow for functionality such as web chat, callback, and co-browse. Extensions may comprise add-ins created and added to a widget. The extensions may also be hosted in the cloud or where ever the user might decide. Extensions may be built by system users to support any number of unique functions where having a widget interface is ideal. For example, in an embodiment, widgets might be streamlined and lightweight elements that can be added to an enterprise website to support activities like chatting with an agent. Extensions for widgets give the ability to leverage the automation tooling of the premises-based platform. In another embodiment, widgets may comprise JavaScript-based, cloud-hosted, and cloud-configured extensions that implement a specific API under a continuously integrated and deployed release model to a premises-based customer experience platform product (such as Genesys Telecommunications Laboratories, Inc.'s PureConnect Platform). In another embodiment, this could also apply to a cloud-based platform product.

Contact Center Systems

FIG. 1 is a diagram illustrating an embodiment of a communication infrastructure, indicated generally at 100. For example, FIG. 1 illustrates a system for supporting a contact center in providing contact center services. The contact center may be an in-house facility to a business or enterprise for serving the enterprise in performing the functions of sales and service relative to the products and services available through the enterprise. In another aspect, the contact center may be operated by a third-party service provider. In an embodiment, the contact center may operate as a hybrid system in which some components of the contact center system are hosted at the contact center premises and other components are hosted remotely (e.g., in a cloud-based environment). The contact center may be deployed on equipment dedicated to the enterprise or third-party service provider, and/or deployed in a remote computing environment such as, for example, a private or public cloud environment with infrastructure for supporting multiple contact centers for multiple enterprises. The various components of the contact center system may also be distributed across various geographic locations and computing environments and not necessarily contained in a single location, computing environment, or even computing device.

Components of the communication infrastructure indicated generally at 100 include: a plurality of end user devices 105A, 105B, 105C; a communications network 110; a switch/media gateway 115; a call controller 120; an IMR server 125; a routing server 130; a storage device 135; a stat server 140; a plurality of agent devices 145A, 145B, 145C comprising workbins 146A, 146B, 146C; an admin/supervisor device 145D; a multimedia/social media server 150; web servers 155; an iXn server 160; a UCS 165; a reporting server 170; and media services 175.

In an embodiment, the contact center system manages resources (e.g., personnel, computers, telecommunication equipment, etc.) to enable delivery of services via telephone or other communication mechanisms. Such services may vary depending on the type of contact center and may range from customer service to help desk, emergency response, telemarketing, order taking, etc.

Customers, potential customers, or other end users (collectively referred to as customers or end users) desiring to receive services from the contact center may initiate inbound communications (e.g., telephony calls, emails, chats, etc.) to the contact center via end user devices 105A, 105B, and 105C (collectively referenced as 105). Each of the end user devices 105 may be a communication device conventional in the art, such as a telephone, wireless phone, smart phone, personal computer, electronic tablet, laptop, etc., to name some non-limiting examples. Users operating the end user devices 105 may initiate, manage, and respond to telephone calls, emails, chats, text messages, web-browsing sessions, and other multi-media transactions. While three end user devices 105 are illustrated at 100 for simplicity, any number may be present.

Inbound and outbound communications from and to the end user devices 105 may traverse a network 110 depending on the type of device that is being used. The network 110 may comprise a communication network of telephone, cellular, and/or data services and may also comprise a private or public switched telephone network (PSTN), local area network (LAN), private wide area network (WAN), and/or public WAN such as the Internet, to name a non-limiting example. The network 110 may also include a wireless carrier network including a code division multiple access (CDMA) network, global system for mobile communications (GSM) network, or any wireless network/technology conventional in the art, including but not limited to 3G, 4G, LTE, etc.

In an embodiment, the contact center system includes a switch/media gateway 115 coupled to the network 110 for receiving and transmitting telephony calls between the end users and the contact center. The switch/media gateway 115 may include a telephony switch or communication switch configured to function as a central switch for agent level routing within the center. The switch may be a hardware switching system or a soft switch implemented via software. For example, the switch 115 may include an automatic call distributor, a private branch exchange (PBX), an IP-based software switch, and/or any other switch with specialized hardware and software configured to receive Internet-sourced interactions and/or telephone network-sourced interactions from a customer, and route those interactions to, for example, an agent telephony or communication device. In this example, the switch/media gateway establishes a voice path/connection (not shown) between the calling customer and the agent telephony device, by establishing, for example, a connection between the customer's telephony device and the agent telephony device.

In an embodiment, the switch is coupled to a call controller 120 which may, for example, serve as an adapter or interface between the switch and the remainder of the routing, monitoring, and other communication-handling components of the contact center. The call controller 120 may be configured to process PSTN calls, VoIP calls, etc. For example, the call controller 120 may be configured with computer-telephony integration (CTI) software for interfacing with the switch/media gateway and contact center equipment. In an embodiment, the call controller 120 may include a session initiation protocol (SIP) server for processing SIP calls. The call controller 120 may also extract data about the customer interaction, such as the caller's telephone number (e.g., the automatic number identification (ANI) number), the customer's internet protocol (IP) address, or email address, and communicate with other components of the system 100 in processing the interaction.

In an embodiment, the system 100 further includes an interactive media response (IMR) server 125. The IMR server 125 may also be referred to as a self-help system, a virtual assistant, etc. The IMR server 125 may be similar to an interactive voice response (IVR) server, except that the IMR server 125 is not restricted to voice and additionally may cover a variety of media channels. In an example illustrating voice, the IMR server 125 may be configured with an IMR script for querying customers on their needs. For example, a contact center for a bank may tell customers via the IMR script to 'press 1' if they wish to retrieve their account balance. Through continued interaction with the IMR server 125, customers may be able to complete service without needing to speak with an agent. The IMR server 125 may also ask an open-ended question such as, "How can I help you?" and the customer may speak or otherwise enter a reason for contacting the contact center. The customer's response may be used by a routing server 130 to route the call or communication to an appropriate contact center resource.

If the communication is to be routed to an agent, the call controller 120 interacts with the routing server (also referred to as an orchestration server) 130 to find an appropriate agent for processing the interaction. The selection of an appropriate agent for routing an inbound interaction may be based, for example, on a routing strategy employed by the routing server 130, and further based on information about agent availability, skills, and other routing parameters provided, for example, by a statistics server 140.

In an embodiment, the routing server 130 may query a customer database, which stores information about existing clients, such as contact information, service level agreement (SLA) requirements, nature of previous customer contacts and actions taken by the contact center to resolve any customer issues, etc. The database may be, for example, Cassandra or any NoSQL database, and may be stored in a mass storage device 135. The database may also be a SQL database and may be managed by any database management system such as, for example, Oracle, IBM DB2, Microsoft SQL server, Microsoft Access, PostgreSQL, etc., to name a few non-limiting examples. The routing server 130 may query the customer information from the customer database via an ANI or any other information collected by the IMR server 125.

Once an appropriate agent is identified as being available to handle a communication, a connection may be made between the customer and an agent device 145A, 145B and/or 145C (collectively referenced as 145) of the identified agent. While three agent devices are illustrated in FIG. 1 for simplicity, any number of devices may be present. An administrator/supervisor device 145D may also be present. The administrator/supervisor device 145D may be controlled by an admin or supervisor in the contact center, who manages the agents. Additionally, the administrator or supervisor can configure settings within the contact center software platform from their device 145D. While only one is illustrated in FIG. 1 for simplicity, any number of administrator/supervisor devices 145D may be present within a contact center or enterprise setting. Collected information about the customer and/or the customer's historical information may also be provided to the agent device for aiding the agent in better servicing the communication and additionally to the contact center admin/supervisor device for managing the contact center. In this regard, each device 145 may include a telephone adapted for regular telephone calls, VoIP calls, etc. The device 145 may also include a computer for communicating with one or more servers of the contact center and performing data processing associated with contact center operations, and for interfacing with customers via voice and other multimedia communication mechanisms.

The contact center system 100 may also include a multimedia/social media server 150 for engaging in media interactions other than voice interactions with the end user devices 105 and/or web servers 155. The media interactions may be related, for example, to email, vmail (voice mail through email), chat, video, text-messaging, web, social media, co-browsing, etc. The multi-media/social media server 150 may take the form of any IP router conventional in the art with specialized hardware and software for receiving, processing, and forwarding multi-media events.

The web servers 155 may include, for example, social interaction site hosts for a variety of known social interaction sites to which an end user may subscribe, such as Facebook, Twitter, Instagram, etc., to name a few non-limiting examples. In an embodiment, although web servers 155 are depicted as part of the contact center system 100, the web servers may also be provided by third parties and/or maintained outside of the contact center premise. The web servers 155 may also provide web pages for the enterprise that is being supported by the contact center system 100. End users may browse the web pages and get information about the enterprise's products and services. The web pages may also provide a mechanism for contacting the contact center via, for example, web chat, voice call, email, web real-time communication (WebRTC), etc. Widgets may be deployed on the websites hosted on the web servers 155.

In an embodiment, deferrable interactions/activities may also be routed to the contact center agents in addition to real-time interactions. Deferrable interaction/activities may comprise back-office work or work that may be performed off-line such as responding to emails, letters, attending training, or other activities that do not entail real-time communication with a customer. An interaction (iXn) server 160 interacts with the routing server 130 for selecting an appropriate agent to handle the activity. Once assigned to an agent, an activity may be pushed to the agent, or may appear in the agent's workbin 146A, 146B, 146C (collectively 146) as a task to be completed by the agent. The agent's workbin may be implemented via any data structure conventional in the art, such as, for example, a linked list, array, etc. In an embodiment, a workbin 146 may be maintained, for example, in buffer memory of each agent device 145.

In an embodiment, the mass storage device(s) 135 may store one or more databases relating to agent data (e.g., agent profiles, schedules, etc.), customer data (e.g., customer profiles), interaction data (e.g., details of each interaction with a customer, including, but not limited to: reason for the interaction, disposition data, wait time, handle time, etc.), and the like. In another embodiment, some of the data (e.g., customer profile data) may be maintained in a customer relations management (CRM) database hosted in the mass storage device 135 or elsewhere. The mass storage device 135 may take form of a hard disk or disk array as is conventional in the art.

In an embodiment, the contact center system may include a universal contact server (UCS) 165, configured to retrieve information stored in the CRM database and direct information to be stored in the CRM database. The UCS 165 may also be configured to facilitate maintaining a history of customers' preferences and interaction history, and to capture and store data regarding comments from agents, customer communication history, etc.

The contact center system may also include a reporting server 170 configured to generate reports from data aggregated by the statistics server 140. Such reports may include near real-time reports or historical reports concerning the state of resources, such as, for example, average wait time, abandonment rate, agent occupancy, etc. The reports may be generated automatically or in response to specific requests from a requestor (e.g., agent/administrator, contact center application, etc.).

The various servers of FIG. 1 may each include one or more processors executing computer program instructions and interacting with other system components for performing the various functionalities described herein. The computer program instructions are stored in a memory implemented using a standard memory device, such as for example, a random-access memory (RAM). The computer program instructions may also be stored in other non-transitory computer readable media such as, for example, a CD-ROM, flash drive, etc. Although the functionality of each of the servers is described as being provided by the particular server, a person of skill in the art should recognize that the functionality of various servers may be combined or integrated into a single server, or the functionality of a particular server may be distributed across one or more other servers without departing from the scope of the embodiments of the present invention.

In an embodiment, the terms "interaction" and "communication" are used interchangeably, and generally refer to any real-time and non-real-time interaction that uses any communication channel including, without limitation, telephony calls (PSTN or VoIP calls), emails, vmails, video, chat, screen-sharing, text messages, social media messages, WebRTC calls, etc.

The media services 175 may provide audio and/or video services to support contact center features such as prompts for an IVR or IMR system (e.g., playback of audio files), hold music, voicemails/single party recordings, multi-party recordings (e.g., of audio and/or video calls), speech recognition, dual tone multi frequency (DTMF) recognition, faxes, audio and video transcoding, secure real-time transport protocol (SRTP), audio conferencing, video conferencing, coaching (e.g., support for a coach to listen in on an interaction between a customer and an agent and for the coach to provide comments to the agent without the customer hearing the comments), call analysis, and keyword spotting.

In an embodiment, the premises-based platform product may provide access to and control of components of the system 100 through user interfaces (UIs) present on the agent devices 145A-C and on the Administrator/Supervisor Device 145D. Within the premises-based platform product, the graphical application generator program may be integrated which allows a user to write the programs (handlers) that control various interaction processing behaviors within the premises-based platform product.

As noted above, the contact center may operate as a hybrid system in which some or all components are hosted remotely, such as in a cloud-based environment. For the sake of convenience, aspects of embodiments of the present invention will be described below with respect to providing modular tools from a cloud-based environment to components housed on-premises.

Widgets

Figure 2:
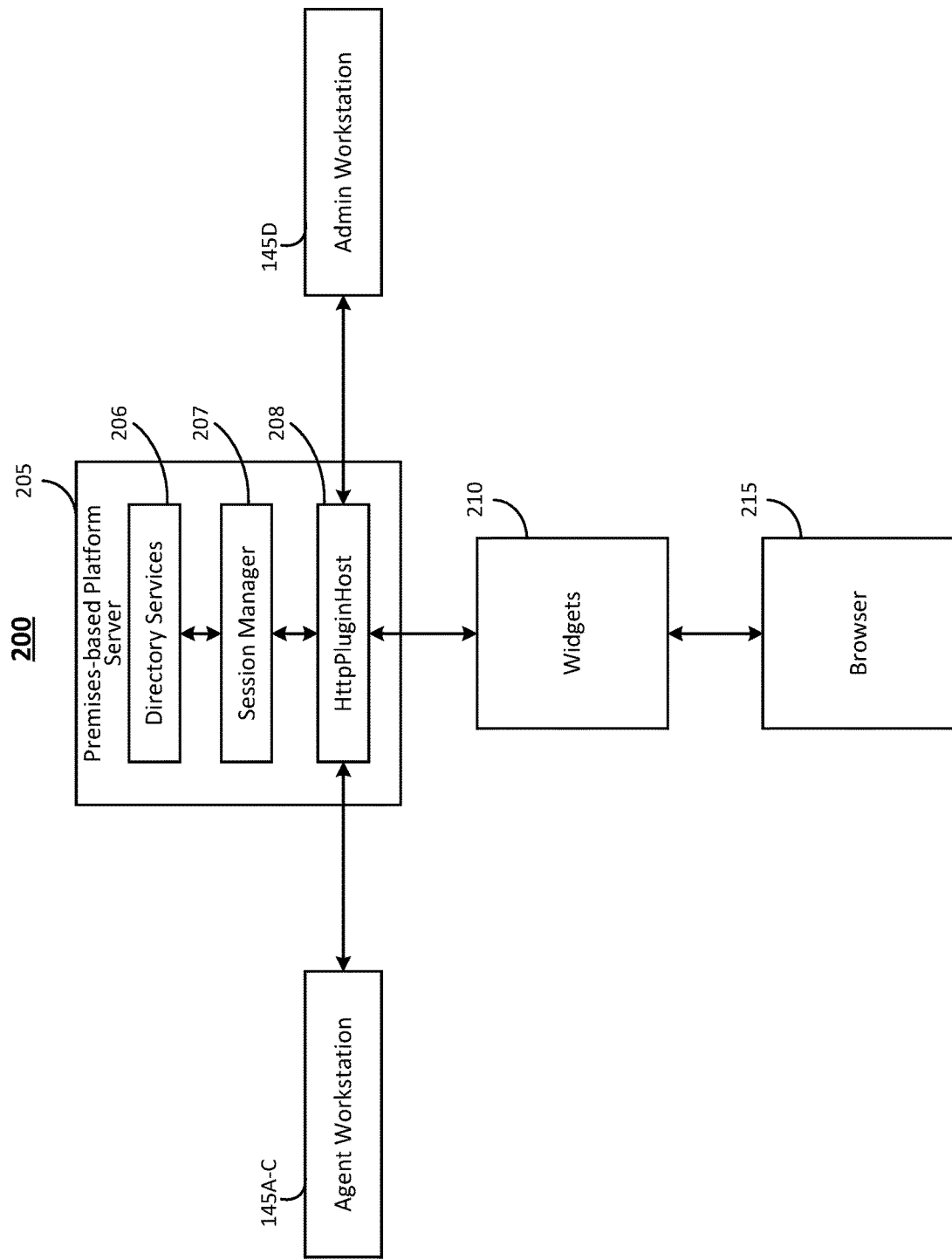
FIG. 2 is a diagram illustrating an embodiment of widgets architecture.

FIG. 2 is a diagram illustrating an embodiment of widgets architecture, indicated generally at 200. Components of the widgets architecture indicated generally at 200 include: the premises-based platform server 205, which may comprise Directory Services 206, a Session Manager 207, and an HttpPluginHost 208; an agent workstation 145A-C, an administrator/supervisor workstation 145D, Modular Tools 210, and a Browser 215.

In an embodiment, the agent workstations 145A-C run the contact center software platform on their devices through which they receive interactions routed to them for handling. In this example, the agents are using a premises-based platform. The premises-based platform client communicates with an HttpPluginHost 208 located on the Server 205 via an Interaction Center Web Services (ICWS). Generally, ICWS manages connections with the server 205, specifies authentication and station settings, watches for connection state-change events, and performs actions relative to the connected Session user. ICWS comprises a RESTful API for web, mobile, and desktop client applications. The Server 205 further comprises Directory Services 206 and a Session Manager 207, which communicate with each other. The Directory Services 206 stores the widgets configuration. The Session Manager 207 further communicates with the HttpPluginHost 208. The HttpPluginHost 208 communicates with the Admin/Supervisor workstation 145D via ICWS. The Administrator/Supervisor workstation 145D is able to handle various aspects of the widgets 210 from their device. In an embodiment, Supervisors are able to configure routing and handle widget registration management. Administrators are able to configure the widget UI. Widgets 210 comprise minified JavaScript code hosted on a cloud service, like Amazon Web Services for example, allowing for continuous integration and deployment. The widgets 210 JavaScript is added to the browser website 210 with a set widget ID and server. The browser website 210 may be hosted in the web servers 155 of the system 100 at FIG. 1.

Figure 3:
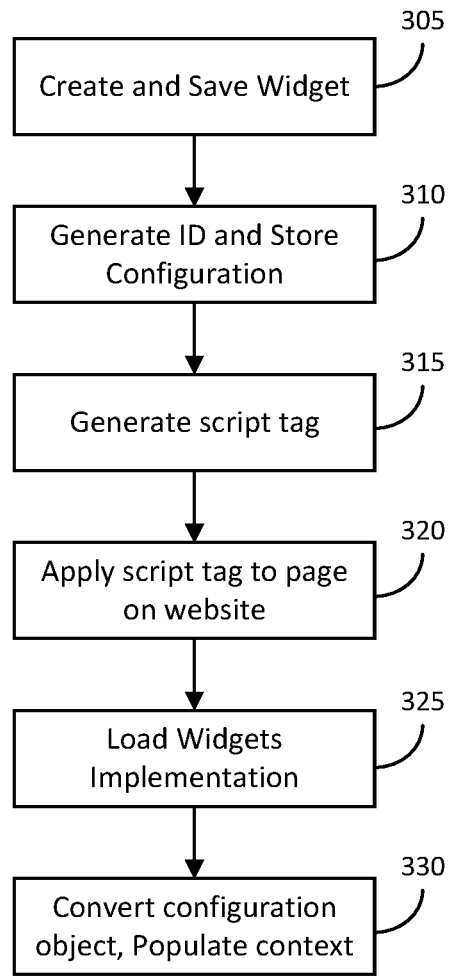
FIG. 3 is a flowchart illustrating an embodiment of a configuration and deployment process for widgets.

FIG. 3 is a flowchart illustrating an embodiment of a configuration and deployment process for widgets, indicated generally at 300. In an embodiment, the modular tools are configured and deployed by means of code snippets included on the website. Using a distributed cloud model, users may reference a single, static script for a widget on a delivery network. The context and configuration dynamically occur based on the widget architecture 200 within premises-based platform product.

In operation 305, an administrator creates and saves a widget. A UI is provided for administrators on their administrator device 145D to add and configure new widgets instances, including those having their own extensions. Factors such as themes, languages, and mobile devices may be configured within a widget, to name a few limiting examples. Other factors unique to the platform, such as the server name, reverse proxy and whether to use HTTP or HTTPS for communications between the web server and the platform server may also be configured. Additionally, language used in the widget may be based on browser preference. In another embodiment, if the widget is unable to use any of the browser's preferred languages, then the widget will use a user selected language.

The widget may also be configured for different modes. For example, mobile mode for devices, desktop mode, or both. The widget code may detect whether the website visitor is using a desktop browser or a mobile browser. Plugins may also be controlled through configuration. For example, the list of plugin names available may be dynamically changed so that different widget configurations access different plugins. Additionally, custom JavaScript Object Notation (JSON) objects may also be injected into the configuration to extend configuration beyond its current structure.

In an embodiment, built-in extensions, such as web chat or callback to name a few non-limiting examples, may be available for a given widgets configuration. These extensions and their configuration might live in the cloud (such as on a web server 155 or a cloud hosting service) and dynamically appear for premises-based platform users.

Additionally, fields which may be available for configuration to any given user depend on permissions granted to the current user. The granularity of permissions is provided at an administrator/supervisor level. Other parties, such as development teams within the contact center environment, may also be able to add extensions. The custom extensions may be hosted by the creator and simply referenced by the configuration instance.

In another embodiment, the provided UI is provided at the premises-based level from the Cloud. Options may be read-in from a JSON file in the cloud, which can be used to make updates at the premises-level. This allows for updates to be done dynamically and continuously and in real-time. Changes may be exposed to a user in a continuous manner through the cloud, as opposed to scheduled updates periodically provided. Control is passed to operation 310 and the process 300 continues.

In operation 310, an identification (ID) is generated and the configuration stored. In an embodiment, once a widget has been created and saved, a unique ID may be generated, and the configuration stored as a flattened JSON object within the Directory Services 206 subsystem of the premises-based platform. Control is passed to operation 315 and operation 300 continues.

In operation 315, the script tag is generated. In an embodiment, generation of the script tag may be done through generating a JavaScript snippet in the form of an HTML script tag. The server and widget-ID attributes are included in the script, for example, <script src="widgets.min.js" server="x" widget-id="y">. The script-tag generally comprises a location of where tools live and identifiers of which configuration gives the widget context. Further, the script-tag comprises information about which premises-based service(s) the widgets should connect to. In an embodiment where the services are cloud based, only the identifier might be present. In an embodiment, the script tag comprises a static script that is common to all users of the platform. In another embodiment, the script tag comprises encoded script that is de-coded upon loading. Control is passed to operation 320 and the process 300 continues.

In operation 320, the script tag is applied to a page on a website. This represents a single installation step for the modular tools. In an embodiment, the snippet generated in operation 310 is copied for the selected widget by a user and is pasted into a text file which is then added to the appropriate page in the website 215. In an embodiment, any number of widgets may be displayed in a panel in the UI for an administrator to select from. Examples of widgets might comprise: chat, callback, co-browse, offers (e.g., when pop-ups proactively make offers to customers), knowledge centers (such as FAQs), call-us (e.g., a link to click to make a phone call), as well as any number of custom designed widgets made by the user.

In an embodiment, a chat widget, for example, enables a customer to chat with a contact center agent using capabilities like data masking, typing notifications, read receipts, and file transfer capabilities within a UI optimized for both desktop and mobile device browsers. The chat widget might be built-in or have connection options to a third-party chat service. In another embodiment, a webchat widget might allow a customer to start a live chat with an agent. The webchat interface might appear within the page and follow the customer as they traverse the website. Customers can also initiate a Co-browse session with the agent directly from webchat. Other features might include minimize/maximize, auto-reconnect, and invite.

In an embodiment, the script referenced might comprise a static script in which all premises-based platform users using widgets will use. The server and widget-ID attributes are passed to the static file and provide context to the static script. Control is passed to operation 325 and the process 300 continues.

In operation 325, the widgets implementation is loaded. Upon loading, the widgets implementation sends an unauthenticated ICWS registration request using the API to the specified server. ICWS comprises a RESTful API for web, mobile, and desktop client applications. The registration request contains the ID and is used to query Directory Services. Control is passed to operation 330 and the process 300 continues.

In operation 330, the configuration object is converted, and the context populated. The widgets configuration object is converted (by the widgets architecture 200) to the JSON configuration object expected to provide context to the user's widgets instance. This allows widgets to be dynamically configured uniquely for each user with a single widgets version. This is in-line with a cloud-distributed model. The widgets are now populated with context.

In an embodiment, many extensions may be available natively through the widgets product. Each of these extensions require product level API changes to enable widgets to communicate with the premises-based platform server 205. Custom extensions have value from the ability to load as an extension, but less value through their ability to integrate with the platform server. As a result, the premises-based platform has a multiplexing API for custom extensions. Any of the input fields could be used as JSON input for a handler. A custom extension could be created which contains no visible UI and simply monitors for web hooks (or a given event) and provides that information to a premises-based platform handler integration.

In an embodiment, the widgets API comprises a Representational State Transfer (REST) endpoint which serves as a multiplexing channel. The API also exposes a method for custom extension writers to create their own "customAction" function in JavaScript. When this custom action is invoked with a parameter possibly containing some JSON input, a widgets API REST request is sent to the premises-based platform server 205 using the multiplexing API. The destination comprises a custom widgets handler acting as an integration point for widgets.

Handlers may be designed in a product such as Interaction Designer, or a similar client-side application that allows a user to model new interactions processes and customize existing interaction processes. Various inputs and different pathways may be implemented based on the provided input. The ability for a user to define a custom action within JavaScript for a custom widgets extension and also to implement this action inside a custom widgets handler describes the multiplexing functionality. Providing the multiplexing layer between widgets and handlers allows for actions to easily occur and any number of behaviors may be implemented without requiring product change.

In an embodiment, an extension of widgets may be written which allows the premises-based platform's developers to pull configurations from servers that connect and send messages back/forth to the premises-based platform. Traditionally widgets would be searching for a JavaScript file with all of the options in that file instead of being able to communicate directly with the premises-based platform without that file. The web developer and an IT admin within the contact center or enterprise would have to be able to go in to the software and make these changes. The modular tools' configuration and deployment simplifies this approach and allows for a user to perform the work without the involvement of the IT admin or web developer. Additionally, information may be loaded directly from the user's server allowing the widgets to be able to talk/back and forth with the premises-based platform or a cloud-based platform.

Computer Systems

In an embodiment, each of the various servers, controls, switches, gateways, engines, and/or modules (collectively referred to as servers) in the described figures are implemented via hardware or firmware (e.g., ASIC) as will be appreciated by a person of skill in the art. Each of the various servers may be a process or thread, running on one or more processors, in one or more computing devices (e.g., FIGS. 4A, 4B), executing computer program instructions and interacting with other system components for performing the various functionalities described herein. The computer program instructions are stored in a memory which may be implemented in a computing device using a standard memory device, such as, for example, a RAM. The computer program instructions may also be stored in other non-transitory computer readable media such as, for example, a CD-ROM, a flash drive, etc. A person of skill in the art should recognize that a computing device may be implemented via firmware (e.g., an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the exemplary embodiments of the present invention. A server may be a software module, which may also simply be referred to as a module. The set of modules in the contact center may include servers, and other modules.

The various servers may be located on a computing device on-site at the same physical location as the agents of the contact center or may be located off-site (or in the cloud) in a geographically different location, e.g., in a remote data center, connected to the contact center via a network such as the Internet. In addition, some of the servers may be located in a computing device on-site at the contact center while others may be located in a computing device off-site, or servers providing redundant functionality may be provided both via on-site and off-site computing devices to provide greater fault tolerance. In some embodiments, functionality provided by servers located on computing devices off-site may be accessed and provided over a virtual private network (VPN) as if such servers were on-site, or the functionality may be provided using a software as a service (SaaS) to provide functionality over the internet using various protocols, such as by exchanging data using encoded in extensible markup language (XML) or JSON.

Figure 4A:
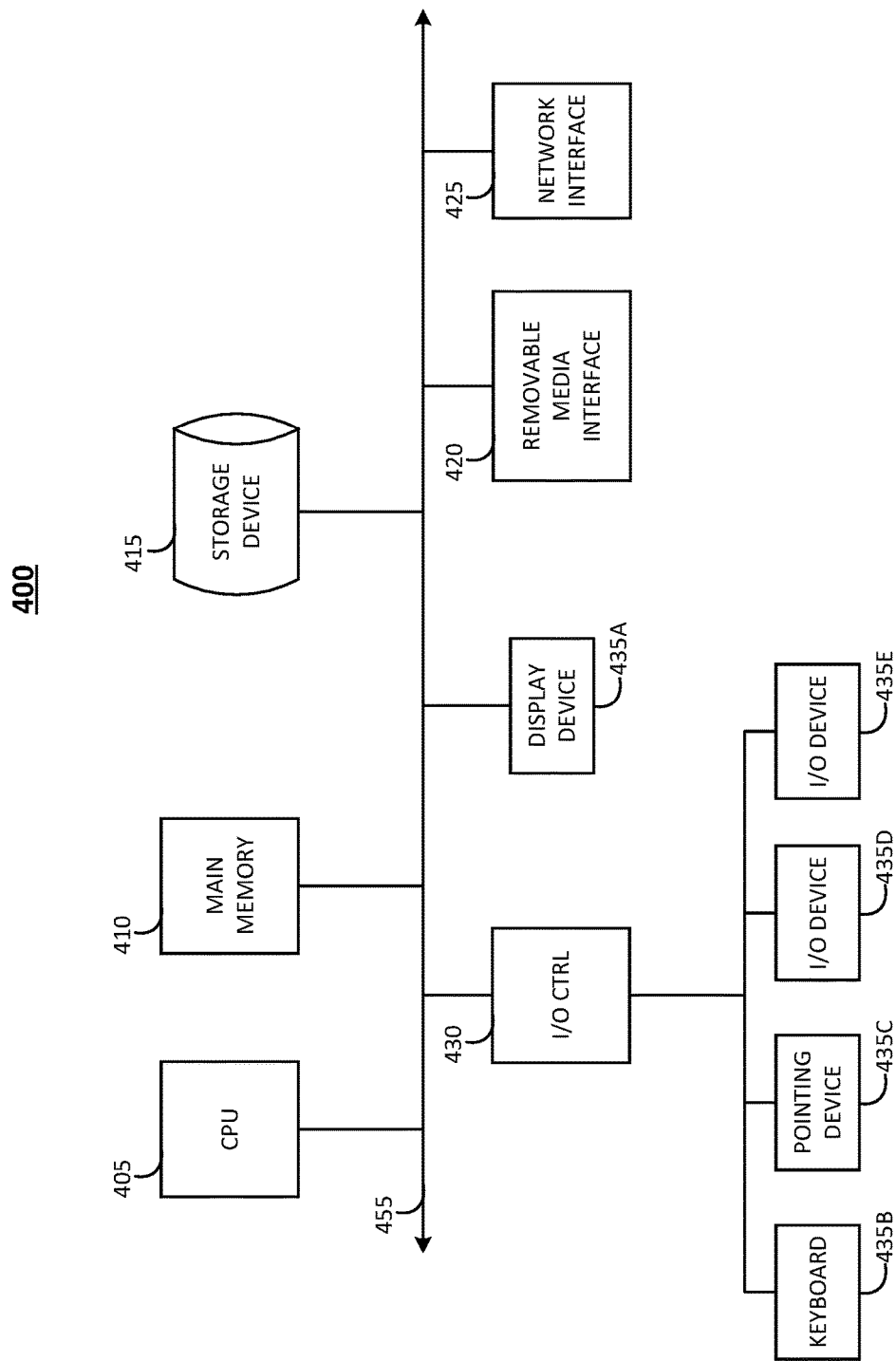
FIG. 4A is a diagram illustrating an embodiment of a computing device.
Figure 4B:
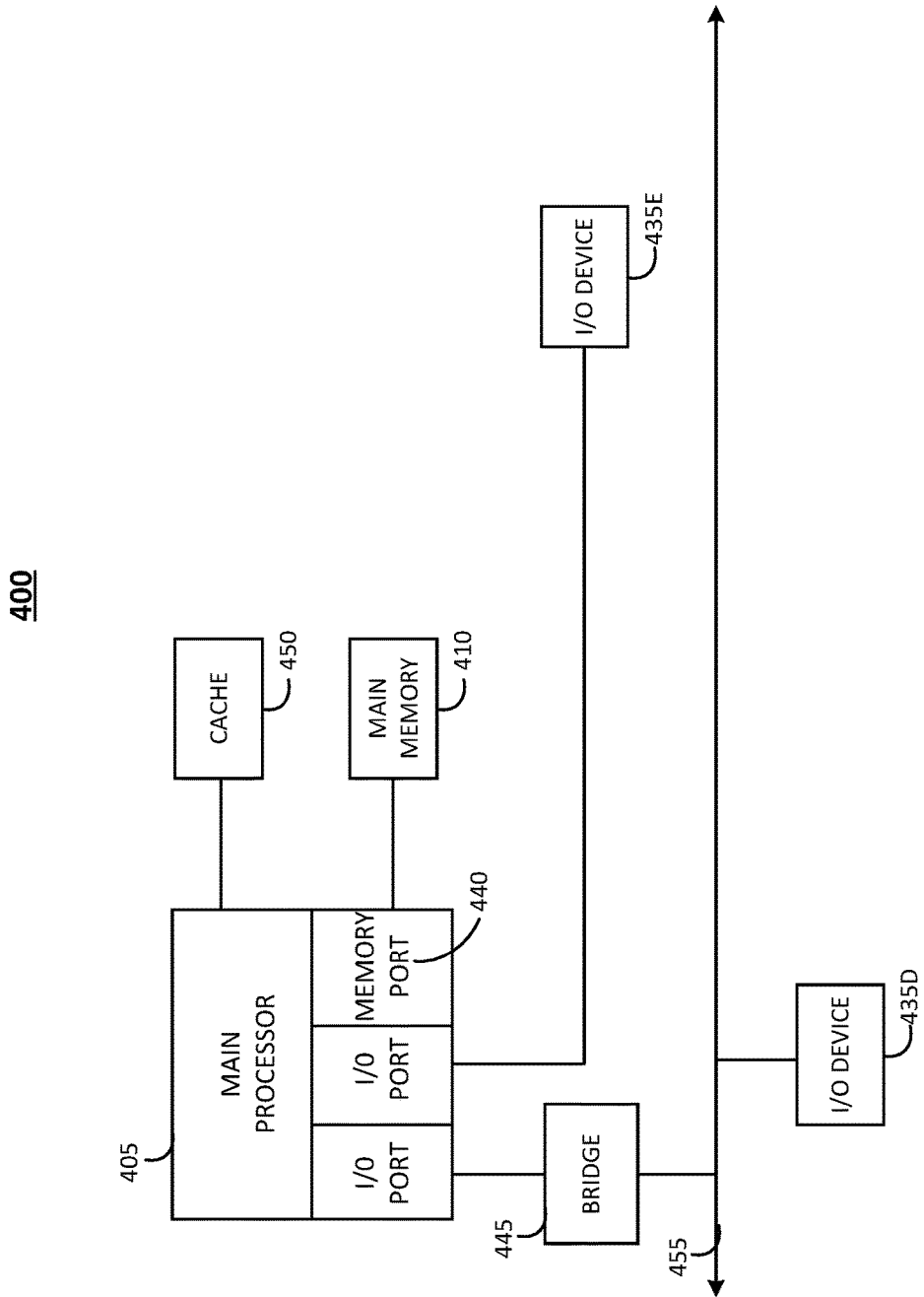
FIG. 4B is a diagram illustrating an embodiment of a computing device.

FIGS. 4A and 4B are diagrams illustrating an embodiment of a computing device as may be employed in an embodiment of the invention, indicated generally at 400. Each computing device 400 includes a CPU 405 and a main memory unit 410. As illustrated in FIG. 4A, the computing device 400 may also include a storage device 415, a removable media interface 420, a network interface 425, an input/output (I/O) controller 430, one or more display devices 435A, a keyboard 435B and a pointing device 435C (e.g., a mouse). The storage device 415 may include, without limitation, storage for an operating system and software. As shown in FIG. 4B, each computing device 400 may also include additional optional elements, such as a memory port 440, a bridge 445, one or more additional input/output devices 435D, 435E, and a cache memory 450 in communication with the CPU 405. The input/output devices 435A, 435B, 435C, 435D, and 435E may collectively be referred to herein as 435.

The CPU 405 is any logic circuitry that responds to and processes instructions fetched from the main memory unit 410. It may be implemented, for example, in an integrated circuit, in the form of a microprocessor, microcontroller, or graphics processing unit, or in a field-programmable gate array (FPGA) or application-specific integrated circuit (ASIC). The main memory unit 410 may be one or more memory chips capable of storing data and allowing any storage location to be directly accessed by the central processing unit 405. As shown in FIG. 4A, the central processing unit 405 communicates with the main memory 410 via a system bus 455. As shown in FIG. 4B, the central processing unit 405 may also communicate directly with the main memory 410 via a memory port 440.

In an embodiment, the CPU 405 may include a plurality of processors and may provide functionality for simultaneous execution of instructions or for simultaneous execution of one instruction on more than one piece of data. In an embodiment, the computing device 400 may include a parallel processor with one or more cores. In an embodiment, the computing device 400 comprises a shared memory parallel device, with multiple processors and/or multiple processor cores, accessing all available memory as a single global address space. In another embodiment, the computing device 400 is a distributed memory parallel device with multiple processors each accessing local memory only. The computing device 400 may have both some memory which is shared and some which may only be accessed by particular processors or subsets of processors. The CPU 405 may include a multicore microprocessor, which combines two or more independent processors into a single package, e.g., into a single integrated circuit (IC). For example, the computing device 400 may include at least one CPU 405 and at least one graphics processing unit.

In an embodiment, a CPU 405 provides single instruction multiple data (SIMD) functionality, e.g., execution of a single instruction simultaneously on multiple pieces of data. In another embodiment, several processors in the CPU 405 may provide functionality for execution of multiple instructions simultaneously on multiple pieces of data (MIMD). The CPU 405 may also use any combination of SIMD and MIMD cores in a single device.

FIG. 4B depicts an embodiment in which the CPU 405 communicates directly with cache memory 450 via a secondary bus, sometimes referred to as a backside bus. In other embodiments, the CPU 405 communicates with the cache memory 450 using the system bus 455. The cache memory 450 typically has a faster response time than main memory 410. As illustrated in FIG. 4A, the CPU 405 communicates with various I/O devices 435 via the local system bus 455. Various buses may be used as the local system bus 455, including, but not limited to, a Video Electronics Standards Association (VESA) Local bus (VLB), an Industry Standard Architecture (ISA) bus, an Extended Industry Standard Architecture (EISA) bus, a Micro Channel Architecture (MCA) bus, a Peripheral Component Interconnect (PCI) bus, a PCI Extended (PCI-X) bus, a PCI-Express bus, or a NuBus. For embodiments in which an I/O device is a display device 435A, the CPU 405 may communicate with the display device 435A through an Advanced Graphics Port (AGP). FIG. 4B depicts an embodiment of a computer 400 in which the CPU 405 communicates directly with I/O device 435E. FIG. 4B also depicts an embodiment in which local buses and direct communication are mixed: the CPU 405 communicates with I/O device 435D using a local system bus 455 while communicating with I/O device 435E directly.

A wide variety of I/O devices 435 may be present in the computing device 400. Input devices include one or more keyboards 435B, mice, trackpads, trackballs, microphones, and drawing tables, to name a few non-limiting examples. Output devices include video display devices 435A, speakers and printers. An I/O controller 430 as shown in FIG. 4A, may control the one or more I/O devices, such as a keyboard 435B and a pointing device 435C (e.g., a mouse or optical pen), for example.

Referring again to FIG. 4A, the computing device 400 may support one or more removable media interfaces 420, such as a floppy disk drive, a CD-ROM drive, a DVD-ROM drive, tape drives of various formats, a USB port, a Secure Digital or COMPACT FLASH' memory card port, or any other device suitable for reading data from read-only media, or for reading data from, or writing data to, read-write media. An I/O device 435 may be a bridge between the system bus 455 and a removable media interface 420.

The removable media interface 420 may, for example, be used for installing software and programs. The computing device 400 may further include a storage device 415, such as one or more hard disk drives or hard disk drive arrays, for storing an operating system and other related software, and for storing application software programs. Optionally, a removable media interface 420 may also be used as the storage device. For example, the operating system and the software may be run from a bootable medium, for example, a bootable CD.

In an embodiment, the computing device 400 may include or be connected to multiple display devices 435A, which each may be of the same or different type and/or form. As such, any of the I/O devices 435 and/or the I/O controller 430 may include any type and/or form of suitable hardware, software, or combination of hardware and software to support, enable or provide for the connection to, and use of, multiple display devices 435A by the computing device 400. For example, the computing device 400 may include any type and/or form of video adapter, video card, driver, and/or library to interface, communicate, connect or otherwise use the display devices 435A. In an embodiment, a video adapter may include multiple connectors to interface to multiple display devices 435A. In another embodiment, the computing device 400 may include multiple video adapters, with each video adapter connected to one or more of the display devices 435A. In other embodiments, one or more of the display devices 435A may be provided by one or more other computing devices, connected, for example, to the computing device 400 via a network. These embodiments may include any type of software designed and constructed to use the display device of another computing device as a second display device 435A for the computing device 400. One of ordinary skill in the art will recognize and appreciate the various ways and embodiments that a computing device 400 may be configured to have multiple display devices 435A.

An embodiment of a computing device indicated generally in FIGS. 4A and 4B may operate under the control of an operating system, which controls scheduling of tasks and access to system resources. The computing device 400 may be running any operating system, any embedded operating system, any real-time operating system, any open source operation system, any proprietary operating system, any operating systems for mobile computing devices, or any other operating system capable of running on the computing device and performing the operations described herein.

The computing device 400 may be any workstation, desktop computer, laptop or notebook computer, server machine, handled computer, mobile telephone or other portable telecommunication device, media playing device, gaming system, mobile computing device, or any other type and/or form of computing, telecommunications or media device that is capable of communication and that has sufficient processor power and memory capacity to perform the operations described herein. In some embodiments, the computing device 400 may have different processors, operating systems, and input devices consistent with the device.

In other embodiments, the computing device 400 is a mobile device. Examples might include a Java-enabled cellular telephone or personal digital assistant (PDA), a smart phone, a digital audio player, or a portable media player. In an embodiment, the computing device 400 includes a combination of devices, such as a mobile phone combined with a digital audio player or portable media player.

A computing device 400 may be one of a plurality of machines connected by a network, or it may include a plurality of machines so connected. A network environment may include one or more local machine(s), client(s), client node(s), client machine(s), client computer(s), client device(s), endpoint(s), or endpoint node(s) in communication with one or more remote machines (which may also be generally referred to as server machines or remote machines) via one or more networks. In an embodiment, a local machine has the capacity to function as both a client node seeking access to resources provided by a server machine and as a server machine providing access to hosted resources for other clients. The network may be LAN or WAN links, broadband connections, wireless connections, or a combination of any or all of the above. Connections may be established using a variety of communication protocols. In one embodiment, the computing device 400 communicates with other computing devices 400 via any type and/or form of gateway or tunneling protocol such as Secure Socket Layer (SSL) or Transport Layer Security (TLS). The network interface may include a built-in network adapter, such as a network interface card, suitable for interfacing the computing device to any type of network capable of communication and performing the operations described herein. An I/O device may be a bridge between the system bus and an external communication bus.

In an embodiment, a network environment may be a virtual network environment where the various components of the network are virtualized. For example, the various machines may be virtual machines implemented as a software-based computer running on a physical machine. The virtual machines may share the same operating system. In other embodiments, different operating system may be run on each virtual machine instance. In an embodiment, a "hypervisor" type of virtualizing is implemented where multiple virtual machines run on the same host physical machine, each acting as if it has its own dedicated box. The virtual machines may also run on different host physical machines.

Other types of virtualization are also contemplated, such as, for example, the network (e.g., via Software Defined Networking (SDN)). Functions, such as functions of session border controller and other types of functions, may also be virtualized, such as, for example, via Network Functions Virtualization (NFV).

While the invention has been illustrated and described in detail in the drawings and foregoing description, the same is to be considered as illustrative and not restrictive in character, it being understood that only the preferred embodiment has been shown and described and that all equivalents, changes, and modifications that come within the spirit of the invention as described herein and/or by the following claims are desired to be protected.

Hence, the proper scope of the present invention should be determined only by the broadest interpretation of the appended claims so as to encompass all such modifications as well as all relationships equivalent to those illustrated in the drawings and described in the specification.

The invention claimed is:

1. A method for delivering widgets through a cloud-based remote computing environment to a premises-based customer experience platform product, the method comprising:
   a. creating and saving a widget by a user through a user interface provided on a device connected to the premises-based customer experience platform product;
   b. generating a unique ID and storing a configuration of the widget as a flattened JSON (JavaScript Object Notation) object within a subsystem of the premises-based customer experience platform product;
   c. generating a JavaScript snippet associated with the widget as an HTML (Hypertext Markup Language) script tag;
   d. applying the JavaScript snippet associated with the widget to a page in a website;
   e. loading implementation of the widget, where an unauthenticated registration request is sent to a server specified in the JavaScript snippet; and
   f. converting a configuration object to a JSON (JavaScript Object Notation) configuration object expected to provide context to the widget and populating the widget with the context.

2. The script tag of claim 1, wherein the HTML script tag comprises a unique ID and server attributes for the widget.

3. The script tag of claim 1, wherein the HTML script tag comprises a common static script.

4. The method of claim 1, wherein the widget further comprises an extension.

5. The method of claim 4, wherein step (f) further comprises utilizing a multiplexing API (Application Programming Interface) where any input fields for population are used as JSON input for a handler.

6. The method of claim 5, wherein the API comprises a REST Representation State Transfer) endpoint.

7. The method of claim 6, wherein invoking the JSON input triggers a REST request to be sent to the server.

8. The method of claim 7, wherein the handler serves as an integration point.

9. A method for delivering widgets through a cloud-based remote computing environment to a premises-based customer experience platform product, the method comprising:
   a. creating and saving a plurality of widget instances by a user through a user interface provided on a device connected to the premises-based customer experience platform product;
   b. selecting a first instance of the plurality of widget instances by the user;
   c. generating a unique ID and storing a configuration of the first instance as a flattened JSON (JavaScript Object Notation) object within a subsystem of the premises-based customer experience platform product;
   d. generating a script tag for the first instance through the user interface;
   e. installing the generated script tag on a page of a website of the user;
   f. loading implementation of the first widget instance, where an unauthenticated registration request is sent to a server specified in the script tag;
   g. converting, by widgets architecture within the premises-based customer experience platform product, a configuration object to a JSON configuration object expected to provide context to the user's widgets instance; and
   h. populating the first instance with context.

10. The method of claim 9, wherein each of the plurality of widget instances has associated extensions.

11. The method of claim 10, wherein the extensions are at least one of: custom and built-in.

12. The method of claim 11, wherein the custom or built-in extensions are hosted by the user and referenced by a configuration instance.

13. The method of claim 10, wherein the extensions and associated configurations are cloud-based and dynamically appear for the premises-based customer experience platform product.

14. The method of claim 9, wherein the user interface comprises fields acting as feature toggles for features and functionality.

15. The method of claim 14, wherein the fields are available based on user permissions.

16. The method of claim 9, wherein the script tag comprises a common static script.

17. The method of claim 9, wherein the script tag comprises encoded script that is de-coded upon loading.

18. The method of claim 9, wherein the script tag comprises a unique ID and server attributes for the widget.

19. The method of claim 9, wherein any changes to the widgets are performed dynamically and continuously through the cloud to the premises-based customer experience platform product.

20. The method of claim 9, wherein step (g) further comprises utilizing a multiplexing API (Application Programming Interface) where any input fields for population are used as JSON input for a handler.

21. The method of claim 20, wherein the multiplexing API comprises a REST (Representation State Transfer) endpoint.

22. The method of claim 21, wherein invoking the JSON input triggers a REST request to be sent to the server using the multiplexing API.

23. The method of claim 22, wherein the handler serves as an integration point between the handler and the first instance.

\* \* \* \* \*